TRANSVERSAL FILTER HAVING A TAPPED AND AN UNTAPPED DELAY LINE OF EQUAL DELAY, CONCATENATED TO EFFECTIVELY PROVIDE SUBDIVIDED DELAYS ALONG BOTH LINES

Filed Dec. 20, 1963 3 Sheets-Sheet 1

INVENTOR.
HERMAN L. BLASBALG
BY George C. Kurtora
AGENT

FIG. 1A, FIG. 3A (LINE 12), FIG. 3B (LINE 27), FIG. 3C (LINE 29), FIG. 3D (LINE 31), FIG. 3E (LINE 40)

United States Patent Office 3,297,951

Patented Jan. 10, 1967

3,297,951

TRANSVERSAL FILTER HAVING A TAPPED AND AN UNTAPPED DELAY LINE OF EQUAL DELAY, CONCATENATED TO EFFECTIVELY PROVIDE SUB-DIVIDED DELAYS ALONG BOTH LINES

Herman L. Blasbalg, Baltimore, Md., assignor to International Business Machines Corporation, New York, N.Y., a corporation of New York Filed Dec. 20, 1963, Ser. No. 332,164
10 Claims. (Cl. 328—37)

This invention relates to matched filters. More particularly, the invention relates to matched filters having exteremely large WT products.

Electrical circuits, called matched filters, are becoming increasingly known and useful in a variety of applications. Basically, matched filters are electrical circuits that are so designed as to be uniquely responsive (i.e., matched) to a particular signal and they are employed, inter alia, in radar systems and communications systems principally as signal extraction, or signal detection, devices. For a more detailed understanding of matched filters, reference may be had to the June 1960 issue of the IRE Transactions on Information Theory. The entire issue is devoted to matched filters and they are discussed in a number of applications both as signal recognition and signal generation devices.

It will become apparent, as described in the above reference and as is well known to those skilled in the art, that the use of matched filters has been retarded because of the limitations in magnitude of the so-called WT product of the wave forms which they are capable of detecting, or generating. The WT product is a dimensionless index formed from the bandwidth of a signal multiplied by its duration and this index may be associated either with the signal itself or its "matched" filter. Briefly, it is accurate to say that the larger the WT product of a matched filter, the better it is adapted to deal with signals in a variety of communications applications. To date, matched filters having large WT products have not been feasible, being largely limited to magnitudes no greater than 300 to 400.

The limitation on the size of WT product of matched filters has resulted largely from the implementation which has been found most realizable for these devices. Fundamentally, a matched filter is a correlation device, and its most frequent implementation has involved the use of a delay line with a number of taps spaced there along. As a signal is propagated down the delay line, signals appear at each one of the taps and these signals are thereafter provided to a matrix of weighting resistors which proceed to analyze, that is, correlate, the signal being propagated down the delay line. The combination of the signals appearing across the weighted resistors is then summed by a linear summing network which provides an output signal indicating the correlation of the signal propagated down the delay line with the parameters established by the weighting of the resistors. One of the evidently obvious ways of increasing the WT product of a matched filter is to increase the number of taps spaced along the delay line. However, to achieve WT products on the order of a thousand, would entail a prohibitively large number of taps on a delay line. For those matched filters, which are commonly classified as analog, a large number of taps presents several serious problems. In the first instance it is difficult enough to tap some analog delay lines, such as quartz delay lines. Even further, tapping (when that is possible) almost inevitably involves some losses and in addition creates undesirable phase distortion characteristics from the reflections generated by the tapping points.

For that class of matched filters, commonly known as digital matched filters, (because they employ a digital shift register as a simulated delay line) a large number of taps (spaced along the shift register at each stage thereof) avoids the problems of the analog delay lines, but creates its own problems in fact that, over a large number of stages, the timing relationships between each one of them must be extremely precise. For a very large number of stages, it becomes increasingly difficult to maintain proper timing relationships.

Thus, the undesirable distortions and losses introduced by tapping analog delay lines, as well as the difficulty of even tapping some of them, coupled with the critical timing relationship arising in digital matched filters which employ large shift registers, have prevented matched filters from achieving large WT products.

Accordingly, it is the prime object of this invention to provide a new and improved matched filter.

It is another object of this invention to provide a matched filter having a WT product in excess of one thousand.

It is another object of this invention to provide a matched filter which eliminates the need for long, tapped delay lines.

It is yet another object of this invention to provide a matched filter which eliminates the use of extremely large shift registers in a digital matched filter.

According to the invention, matched filters, having a WT product in the excess of one thousand, are realized without making the tapped delay lines which generate the wave form, excessively large. This is achieved by connecting to the taps of a delay line of moderate length, a plurality of weighting matrices, instead of only one (as the prior art has done) so that one delay line feeds a plurality of resistor matrices, with each matrix simultaneously generating a separate wave form. These wave forms are thereafter provided to delaying means, with each wave form being delayed a proportional multiple of the signal wave form duration, and thereafter the thus delayed wave forms are additively combined to produce a resultant wave form which extends for a duration that is a multiple of the duration of any single wave form. Having thus increased the duration T of the resultant wave form, the product WT is therefore increased in a like manner.

The foregoing and other objects, features, and advantages of the invention will be apparent from the following more particular description of preferred embodiments of the invention, as illustrated in the accompanying drawings.

In the drawings:

FIG. 1A shows a diagram illustrating the WT product of a matched filter.

*Structure*

Figure 1:
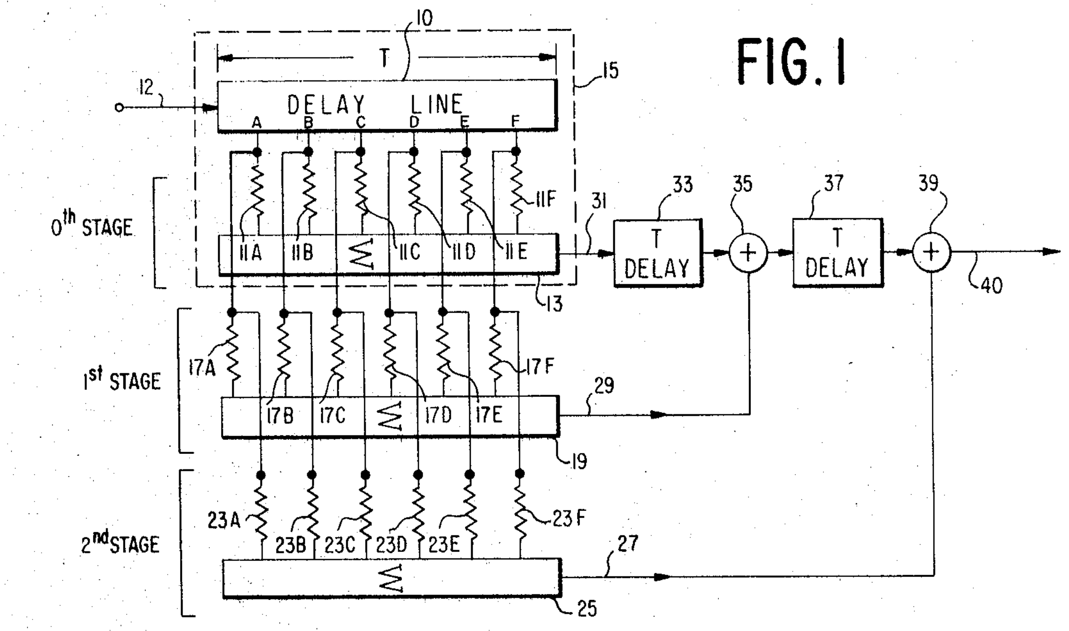
FIG. 1 shows a first embodiment of a large WT product matched filter according to the invention.

Referring now to FIG. 1 there is shown the first embodiment of the invention. A delay line 10, of duration T units of time, has spaced therealong a plurality of taps A, B, C, D, E, and F. Only six taps are illustrated for the delay line 10, but the number may be far higher.

A set of weighted resistors 11A–11F is connected to the respective taps A–F of delay line 10, and the set of resistors terminates in a summation network 13. An input line 12 is connected to the delay line 10 at one end thereof to provide it with signals which will propagate down the delay line 10.

The structure so far described, and shown enclosed in dotted lines, in the dotted block 15 in FIG. 1, represents a basic matched filter. For a more detailed description of how the structure operates, as well as in what particular fashion the resistors 11A–11F are weighted with respect to each other, reference is had to the article "A Matched Filter Detection System for Complicated Doppler Shifted Signals," by Lerner, IRE Transactions on Information Theory, June 1960, pp. 373–386. These details are well known to those in the art and do not, as such, form the gist of this invention.

Also connected to the taps A–F of the delay line 10, are two additional sets of weighted resistors, a first stage of resistors comprising weighted resistors 17A–17F, terminating in a summation network 19, and a second stage of resistors comprising weighted resistors 23A–23F, terminating in a summation network 25.

The output from the first summation network 13 is provided, via line 31, to a delay line 33, of T units of delay. The output from summation circuit 19 is provided on the line 29, to an adder network 35 interposed between delay unit 33 and a second delay unit 37, both of equal duration of T units.

The output from the second stage summing network, that is, summing network 25, is provided via line 27, to adder circuit 39, which is connected to the end of the delay means 27. The combined output from the adder 39, provided on line 40, represents the resultant output of the large WT product matched filter of the invention.

It should be noted at this point that the description has proceeded with an exemplary showing of two additional sets of resistors connected to the structure comprising matched filter 15. Clearly, this has been done for purposes of simplifying the illustration only, since in practice there may be many more stages, of number *n*. Whenever the number of stages is increased, it is only necessary to add further delay means analogous to delay means 33 and 37 between additionally interspersed adder units analogous to adder units 35 and 39. The summation circuits as well as the adder networks are, in essence, linear resistance adders of the general type seen in FIG. 5 on page 18–10 of the text Handbook of Automation, Computation, and Control, vol. 2, Grabbe, Ramo, and Wooldridge, ed.

While the matched filter 15 has been illustrated with reference to a matrix of resistors 11A–11F used as the weighting elements, those skilled in the art will recognize that this weighting may be accomplished as well by other electrical elements, such as amplifiers, whose respective gain characteristics are weighted. Accordingly, whenever the term resistor is used in the specification or claims, it is intended to enhance also functionally equivalent means.

Before proceeding to a description of the operation of the circuitry of FIG. 1, it may be well to recall the general operation of a representative matched filter 15 in connection with the diagrams shown in FIG. 1A.

It is generally well known that a matched filter, such as matched filter 15 (FIG. 1) may be used for both signal generation, as well as signal detection operations. Those skilled in the art will know that these two operations are merely the time inverted versions of each other, so that having described matched filter with reference to its use as a signal generator also reveals its capabilities as a signal detection device. Thus, while the ensuing description, for simplicity and ease of understanding the invention, proceeds on the description of a matched filter, such as 15, used as a signal generator, no such limitation is, of course, intended, as use of the device as a signal detection unit is readily apparent.

Having reference now to FIGS. 1 and 1A, the matched filter 15, in response to a unit step signal applied on input terminal 12, will propagate the signal down the delay line of duration T. As the signal applied to terminal 12 reaches each one of the successively located taps, A, B, C, D, E, F, the weighted resistors 11A–11F provide various weighted signals to the summation network 13. The summation network 13 proceeds to sum all the individual contributing voltages from resistors 11A–11F and produces an output signal on line 31 which is shown in FIG. 1A, where the amplitude time diagram is given. The wave form there shown is a highly complex wave form, of duration T, in the time domain, and having a bandwidth W, as indicated by the amplitude-frequency diagram of the same wave form.

Now, the so-called WT-product of a wave form, is the dimensionless index formed by multiplying the bandwidth of the signal by its duration. This index is representative of the complexity of the wave and it is accurate to say, as those skilled in the art will recognize, that the higher the complexity, that is, the larger the WT product, the more adapted are such wave forms (such as shown in FIG. 1A) for use in communications systems. This fact will also be revealed upon a reading of the above reference referred to publication.

*Operation*

Figure 3:
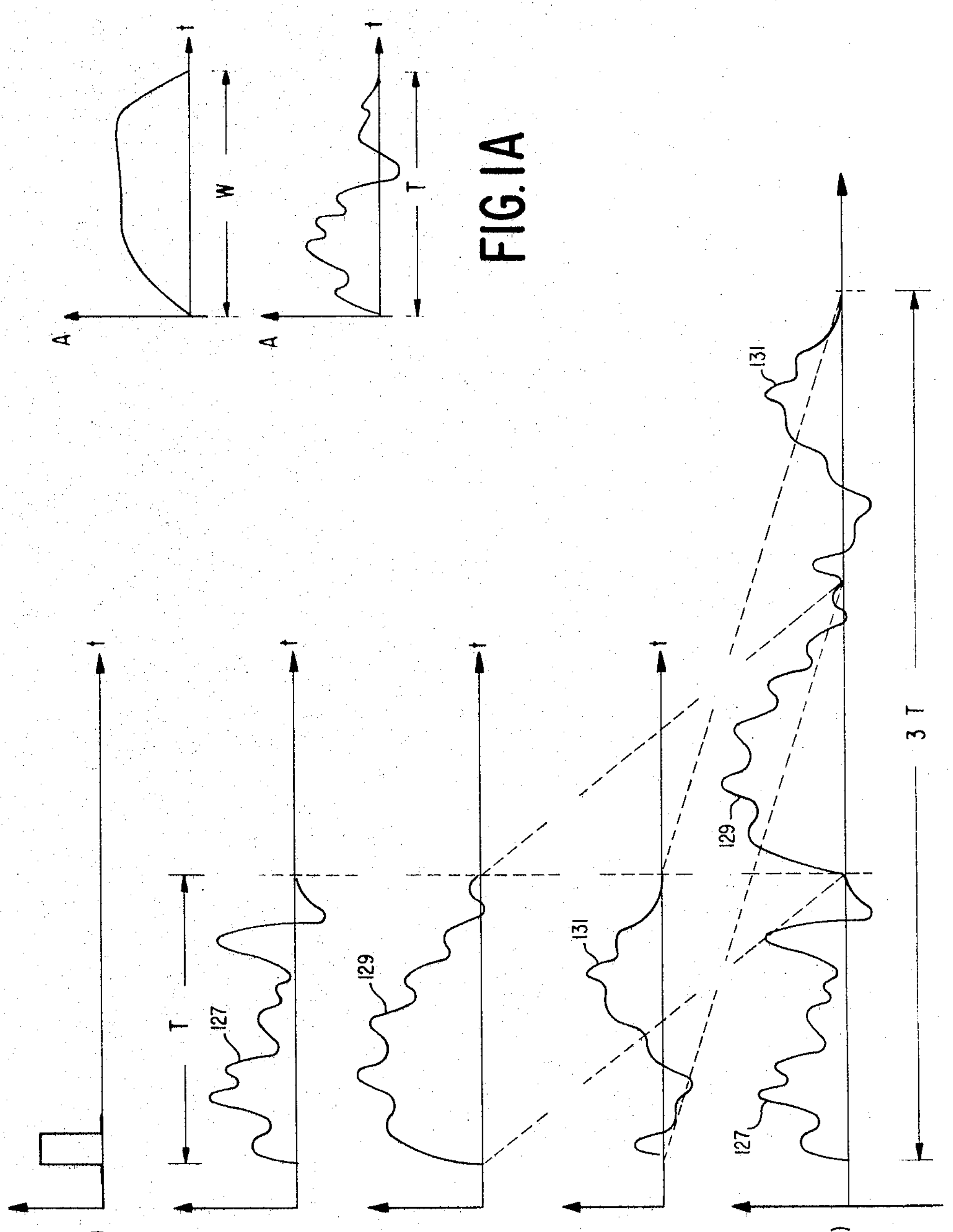
FIGS. 3A–3E shows representative wave forms in the circuits of FIGS. 1 and 2 which illustrate how the structure achieves large WT products.

Referring to FIG. 3A–3E, the operation of the structure disclosed in FIG. 1 will be described. FIG. 3A shows a signal which is applied to line 12 of delay line 10 (FIG. 1). As the signal propagates down the delay line 10, the three stages of weighted resistors 11A–11F, 17A–17F, and 23A–23F, will cause their respective summing networks 13, 19, and 25 to generate the wave forms shown in FIGS. 3B–3D, in a fashion as previously described.

That is, and taking summing network 25 first, it will produce a complex wave form 127 (FIG. 3B) on its output terminal 27, the wave form having a duration of T time units which is equal to the duration of the delay line 10. Simultaneously, summing networks 19 and 13 produce, on their respective output lines, 29 and 31, wave forms 129 and 131. As shown, wave forms 127, 129, and 131 are each different from the other, a factor which is suitably controlled by choosing the appropriate weighting coefficients for each one of the resistor stages.

The wave form 127 is provided on line 27 to the adder circuit 39 whereupon it is produced as an output signal on line 40. The wave form 127 receives no delay and is therefore immediately reproduced on the output line 40.

The wave form 129, produced by summing network 19, is provided to an adder circuit 35 whereafter, it is fed, through delay circuit 37, to adder network 39. This results in the wave form 129 being delayed T units with respect to wave form 127 whereafter it is provided on the output terminal 40, T units of time after it has been produced on line 29.

Similarly, wave form 131, generated by summing network 13 undergoes a similar operation but it is delayed for a sum total of two T units whereafter it is produced on the output terminal 40.

The resultant wave form, on line 40, is thus seen to be the time staggered addition of the plurality of wave forms simultaneously generated by each one of the summing networks. As can be seen from FIG. 3E, the resultant wave form has a duration of 3T, so that the resultant WT product of the output wave form has been increased by a factor 3 (that is, equivalent to the number of stages that have been added to matched filter 15, which itself provides a zeroeth stage).

It is obvious, that the number of stages can be increased to even further increase the resultant WT product of the resultant wave form produced on line 40. This only involves additional resistor matrices, whose summed output is thereafter provided to delaying means in a fashion analogous to the delay that is imposed upon the signal wave forms generated by summing networks 13, 19, and 25.

It should be evident, that what has been done, is to minimize the number of taps necessary to generate large WT wave forms by having only one delay line, delay line 10, (FIG. 1) serve as the "feeding" delay line which generates a plurality of wave forms. The subsequent delays are provided via the *untapped* delay circuits 33 and 37 so that the total number of taps on a delay line, a critical item, as previously mentioned, is not made excessively large. Yet, by allocating the functions best performed to the respective delay lines, i.e. having one (tapped) delay line serve as a "feeder" for a plurality of resistor matrices, and having other delay lines serve only as pure delays, has eliminated the need for large contiguous tapped delay lines, and has, in addition, produced wave forms having extremely large WT products.

Figure 4:
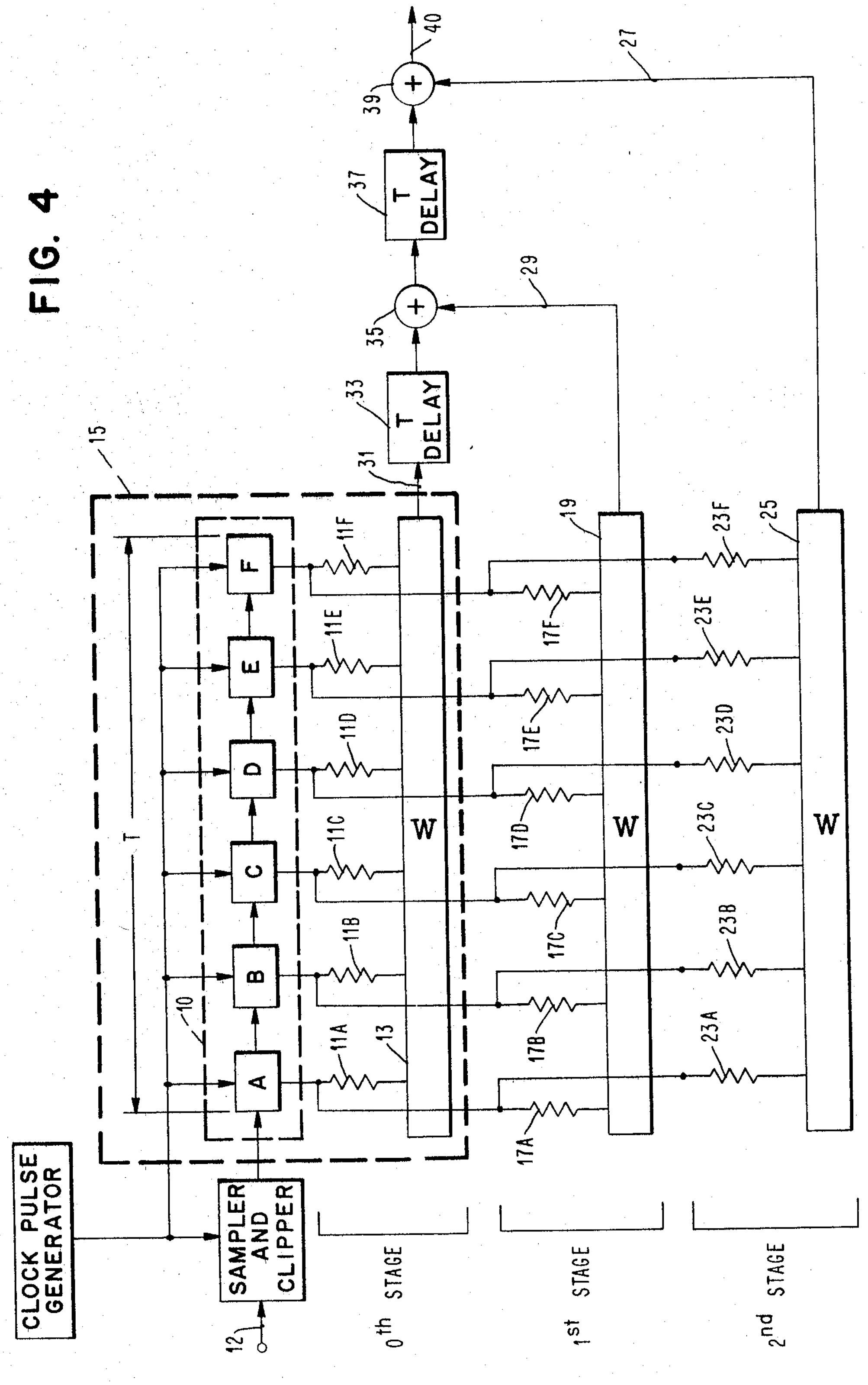
FIG. 4 is the same as FIG. 1, but shows the use of a digital matched filter.

It should again be noted, that while delay line 10 has been illustrated as simply a delay line, and which may very well be an analog delay line, the invention is clearly not limited thereto. Delay line 10 may comprise a digital shift register so that the matched filter 15 becomes of the well-known digital type. It is well known that a tapped delay line with resistor weights at each tap constitutes the linear filter. The array of resistors represents the impulse response of the filter. The delay line accepts the incoming signal, translating it across the spacially distributed resistor weights. The maximum output at the summation network occurs at the instant when the received signal matches the impulse response of the filter. This will occur at the instant when the desired signal fills the delay line. If the input signal, in the proper frequency range, is infinitely equipped and sampled with little loss in output signal-to-noise ratio, then the analog delay line can be replaced by a digital delay line such as a shift register. An illustrative example is seen in FIG. 4. Each tap A through F represents a trigger stage. At each tap a signal is regenerated and precise timing can be achieved by the clock pulse generator shown, consistent with the accuracy inherent in digital techniques.

*Second embodiment*

Figure 2:
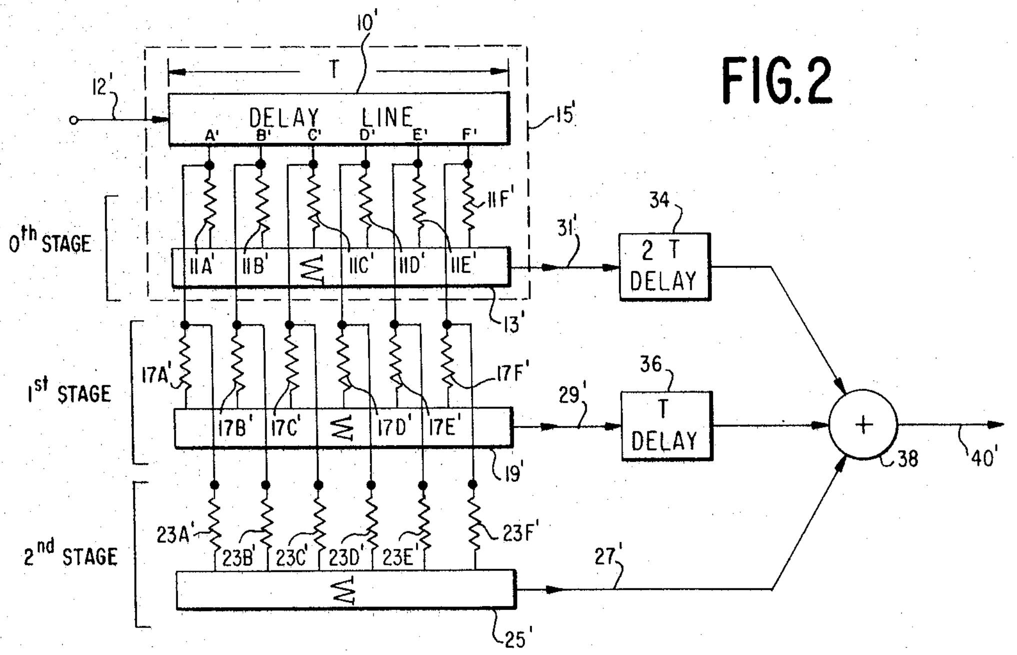
FIG. 2 shows a second embodiment of a large WT product matched filter according to the invention.

Turning now to FIG. 2, a second embodiment of the invention will be described. Briefly, FIG. 2 comprises structure largely similar to that shown in FIG. 1, and this has been indicated by numbering the corresponding elements used in FIG. 2 with the primed versions of numbers used in FIG. 1. The difference between FIGS. 1 and 2 lies in the way the signals generated by the summing means 13', 19', 25' are treated, after they have been generated, in a fashion identical to that described with reference to FIG. 1.

Briefly, as shown in FIG. 2, the plurality of signals simultaneously produced on the respective lines 27', 29', and 31' are applied to delay sections 34 and 36 that are not of the same delay. It is true, however, that the output, produced on terminal 40' is the same as shown with reference to FIGS. 3A–3E, because each of the signals generated by the summing means 13', 19', and 25' receive the same composite delay as provided by the structure shown in FIG. 1.

The reason for providing an embodiment such as shown in FIG. 2, with its use of unequal length delay lines, (thereby, in effect, removing the intermediate adder circuit 35 of FIG. 1) becomes apparent when the structure shown in FIG. 2 is considered for use as a signal detector.

When used as a signal detector, input signals which are to be correlated, are applied to terminal 12' and they are of the form shown in FIG. 3E. By the well-known process by which matched filters work, each of the stages, that is each of the summing networks 13', 19', and 25' will produce wave forms which at one point will rise up steeply to provide, what is known as the auto-correlation peak. This peak is generated only when the signal is "matched" to the filter characteristics and the process may be visualized by considering the wave form shown in FIG. 3E to be the input to delay line 10 (10') in response to which the signal shown in FIG. 3A is generated on line 40.

Under such circumstances, when all three stages 13', 19', and 25' generate wave forms which vary randomly about a mean level until the autocorrelation peak is produced, summing each one of the respective wave forms, and thereafter providing them to delay lines (as is done by the structure in FIG. 1) may result in an amplitude overloading of a particular delay line, e.g., 33. For this reason, the interspersed adding circuits, such as 35, shown in FIG. 1, are dispensed within FIG. 2, where only one final adding circuit 38 is provided at the output of all the delay lines 34, 36. This prevents subjecting a particular one of the delay lines 34 or 36 to the summed version of two signals, which, as previously mentioned, may overload any one of them.

In other respects, the circuitry shown in FIG. 2 operates in a manner similar to that described with reference to FIG. 1, so that the signals generated by the summing networks 13', 19', and 25' are each provided, after a suitable overall delay, to the adder circuit 38.

It should be noted that for both of the embodiments shown in FIGS. 1 and 2, the signal wave form produced by the zeroeth stage of weighting resistors, e.g., 11A–11F in FIG. 1 receives the longest overall delay before appearing on the output line 40, while the signal wave form, e.g., 127 in FIGS. 3B and 3E, produced by the last stage of weighting resistors, i.e., 23A–23F in FIG. 1, receives no delay before appearing on output line 40. For a matched filter employing $n$ stages of weighting resistors, the above relationship may be generalized so that output signal generated by the $n$th stage of weighted resistors receives zero delay, while the output signal generated by the zeroeth stage of weighted resistors receives an overall delay of $n$T units of time before appearing on line 40.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A large WT product signal device, comprising:

a matched filter, including a delay line and a first plurality of weighted resistors spaced along said delay line, said resistors having a voltage applied thereacross in response to a signal applied to said delay line and propagated therealong;

first summing means for summing the voltages developed across said first plurality of resistors for providing a first output signal of duration T;

at least one additional stage comprising a second plurality of weighted resistors connected in parallel with said first plurality of resistors, and a second summining means connected to said second plurality of resistors for providing a second output signal of duration T;

delay means for delaying each of said different output signals for a different duration $n$T where $n$ is an integer ranging from zero to the number of stages, whereby the last stage receives a zero delay and the first stage receives a delay of $n$T; and means for additively combining each of said delayed output signals to produce a composite output signal having a duration of $n$T.

2. Device according to claim 1, wherein said matched filter is a digital matched filter.

3. A large WT signal device, comprising:

first means, including a delay line of duration T and a plurality of $n$ stages of sets of weighted resistors, each of said $n$ stages being connected in parallel to taps spaced along said delay line, and means for summing voltages appearing across resistors in each set in response to a signal applied to said delay line for simultaneously producing $n$ output signals, each having a duration of T units of time;

means for delaying each different one of said $n$ output signals for a different duration $n$T, so that output signal produced by the $n$th stage receives a zero delay and the output signal produced by the zeroeth stage receives a delay of $n$T; and means for additively combining said delayed signals to produce a composite output signal having a duration of $n$T.

4. Device according to claims 3, wherein said delay line comprises a digital shift register.

5. A large WT signal device, comprising:

a delay line having taps spaced therealong and having a duration of T units;

a plurality of sets of weighted resistors, each set of resistors being connected in parallel to said taps, whereby each of said resistors has a signal developed thereacross in response to a signal propagating down said delay line;

means for summing the signals developed by the resistors in each set, and producing an output signal, one for each set of resistors;

means for delaying each of said output signals an amount time that is given by the relationship $n$T, where the $n$th output signal is delayed for a zero duration, and the first output signal is delayed for a duration $n$T; and means for additively combining each of said delayed output signals to produce a composite output signal.

6. Device according to claim 5 wherein said delay line comprises a digital shift register.

7. A large WT signal device, comprising:

a delay line having a duration T and having a plurality of taps spaced therealong;

a plurality of $n$ sets of weighted resistors connected in parallel to said taps;

a plurality of summing means, one for each set, for summing the signal generated by said resistors in response to a signal propagating down said delay line, each of said summing means being adapted to produce an output signal which is the weighted sum of all signals generated by said resistors in a set;

plural stage delay means each stage of duration T, including adder means interposed between each stage of delay T;

means for introducing the output signal produced by a first summing means at the beginning of said plural stage delay means and output signals produced by subsequent summing means at progressively located adder means within said plural stage delay means, whereby the output signal from said plural stage means represents the time staggered addition of all the output signals generated by said summing means.

8. Device according to claim 7 wherein said delay line comprises a digital shift register.

9. A large WT signal device, comprising:

a delay line having a duration T and having a plurality of taps spaced therealong;

a plurality of $n$ sets of weighted resistors connected in parallel to said taps;

a plurality of summing means, one for each set, for summing the signals generated by said resistors in response to signal propagating down said delay line, each of said summing means to produce an output signal which is the weighted signal from all signals generated by said weighted resistors;

a plurality of delay means, each of a different delay $n$T, $n$ varying between zero and up to the number of summing means, for delaying the signals produced by said plurality of summing means each for a different duration $n$T; and means for summing the delayed signals produced by said delay means.

10. A large WT signal device, comprising:

delay means having a duration of T units and having a plurality of taps spaced therealong;

a plurality of sets of weighted elements of number $n$, each set of weighted elements being connected in parallel to said taps, whereby each of said weighted elements develops a signal in response to a signal propagating down said delay means;

means for summing the signal developed by the weighted elements in each set to thereby produce an output signal, one for each set of weighted elements;

means for delaying each of said output signals an amount of time that is given by the relationship $n$T, where the $n$th output signal is delayed for a zero duration and the first output signal is delayed for a duration $n$T, and means for additively combining each of said delayed output signals to produce a composite output signal.

References Cited by the Examiner

UNITED STATES PATENTS

| | | | |
|---|---|---|---|
| 2,716,733 | 8/1955 | Roark | 333—28 |
| 3,054,073 | 11/1962 | Powers | 332—17 |
| 3,081,434 | 3/1963 | Sandburg | 328—22 |
| 3,105,197 | 9/1963 | Aiken | 328—154 |
| 3,111,645 | 11/1963 | Milford | 340—146.3 |
| 3,112,469 | 11/1963 | Milford | 340—146.3 |
| 3,114,132 | 12/1963 | Trumble et al. | 340—146.3 |
| 3,141,153 | 7/1964 | Klein | 333—29 |

OTHER REFERENCES

Lerner, A Matched Filter, etc., IRE Trans. on Information Theory, June 1960, pp. 379–384.

HERMAN KARL SAALBACH, *Primary Examiner.*

C. BARAFF, *Assistant Examiner.*